Patented Feb. 28, 1933

1,899,109

UNITED STATES PATENT OFFICE

KURT RIPPER, OF BERLIN, GERMANY

MOLDING POWDER

No Drawing. Application filed March 21, 1928, Serial No. 263,595, and in Austria March 25, 1927.

This invention relates to a molding powder and process for making the same, which molding powder or composition is prepared by reacting with formaldehyde on thiourea or on thiourea and urea in combination.

I have discovered that in condensing thiourea with a quantity of aqueous formaldehyde not greater than that corresponding with 3 molecules of anhydrous formaldehyde to 1 molecule of thiourea by heating the reaction mixture for a sufficient long time either in presence or absence of a condensing agent or catalyst, formation of a hydrophobe resinous condensation product takes place having the property of being converted by intimate contact with a watery liquid into a fine powder which is exceedingly satisfactory for making molded articles by the simple operation of pressing, especially by hot-pressing. The condensation is conducted up to a stage at which on cooling a sample of the obtained condensation solution which is clear as water a hydrophobe condensation product precipitates therefrom. After this condition has been attained, the heating is interrupted and the reaction mass is brought into intimate contact with water. Thereafter the mixture is allowed to stand at rest until conversion of the first formed condensation product into a fine powder has taken place. This disintegration into a powder may be promoted by mechanical treatment, such as kneading, beating, stirring and the like.

Thus, even with a proportion of the starting ingredients corresponding to 1.4 molecules of formaldehyde to 1 molecule of thiourea clear condensation solutions are obtained, from which on cooling condensation products are separating which pass over into the powdery state on contact with water. These condensation products which melt under heat are the more hydrophobe, the smaller proportions of formaldehyde had been used to effect the condensation.

Moreover it has been found that in the same way by reacting with formaldehyde on thiourea and urea in combination mixed condensation products having similar properties are obtained, provided that the molecular proportion of the thiourea in the product is not less than corresponds with 1 molecule of thiourea to 1 molecule of urea. These mixed condensation products too have the property of being converted, when intimately contacted with water or aqueous solutions, into a fine powder which is exceedingly suited for molding purposes. The formaldehyde may preferably be employed in a quantity not greater than corresponding to a molecular proportion of 2 molecules of formaldehyde to 1 molecule of each of the two other starting substances (thiourea and urea). By simultaneously condensing a mixture of thiourea and urea with formaldehyde a mixed hydrophobe condensation product is obtained which in contact with water undergoes conversion into a molding powder yielding opaque articles, when molded in a hot-press. But if at first condensation between the thiourea and formaldehyde is initiated and only thereafter a solution of urea in formaldehyde is added to the reaction mixture thus obtained, the process will result in the formation of a molding powder which, when hot-pressed, yields products as clear as water.

Both the condensation products from formaldehyde and thiourea and the mixed condensation products obtained by reacting with formaldehyde on thiourea and urea in combination, are by the treatment with water, as above described, converted into fine powders which by washing can be freed very easily from soluble by-products and are capable of being dried very quickly and forming thereby a homogenous powdery material perfectly free from electrolytes, if desired, and fit to be brought into the highest degree of fineness by means of the simplest technical procedures.

The following examples illustrate the invention, the parts being by weight and the formaldehyde solution being one of 40 per cent by volume:

1. 100 parts (1 molecule) of thiourea are dissolved in 154 parts of the formaldehyde solution (1.4 molecules of formaldehyde) in a boiler with a reflux condenser. The mixture is heated up to boiling and maintained at the boiling temperature until there is effected the formation of a hydrophobe resinous condensation product which separates from a sample of the reaction mass on cooling and undergoes conversion into a fine powder when brought in intimate contact with water. This condition is attained after a treatment of about 1½ to 2 hours. Now the heating is interrupted and the whole of the hot reaction mass poured into cold water and allowed to stand at rest until the first formed condensation product has been converted into a fine powder. Advantageously such conversion is promoted by mechanical treatment such as kneading, beating, stirring and the like. After about 24 hours the fine powder formed in the mixture from the precipitated condensation product is separated from the bulk of the liquid by filtering and washed with water. By short drying a molding powder is obtained therefrom, which, when hot-pressed will yield a transparent article having the clarity of glass.

2. In carrying out the process as set forth in Example 1 the proportions of the ingredients may be varied as follows: 100 parts of thiourea and 200 parts of the formaldehyde solution. In this case boiling is to be continued for a longer time as the formation of the hydrophobe resin seems to be retarded by the presence of a larger proportion of formaldehyde.

3. 100 parts of thiourea and 51.3 parts of urea are dissolved in 142 parts of the formaldehyde solution, which proportions of the starting components correspond to a ratio of 3 molecules of thiourea to 2 molecules of urea and to 4 molecules of formaldehyde. The hydrophobe resin is formed after boiling for about 1½ hours. The fine powder which is formed by intimately contacting the hydrophobe resin with water yields, when hot-pressed, opaque articles.

4. 100 parts of thiourea and 79 parts of urea are dissolved in 220 parts of the formaldehyde solution. These proportions correspond to a ratio of 1 molecule of thiourea to 1 molecule of urea and 2 molecules of formaldehyde. The above treatment yields a very fine powder from which opaque molded articles may be obtained.

5. 100 parts of thiourea and 79 parts of urea are dissolved in 440 parts of the formaldehyde solution. These proportions correspond to a ratio of 1 molecule of thiourea to 1 molecule of urea and 4 molecules of formaldehyde. After maintaining the mixture for about 2 or 2½ hours at the boiling temperature the formation of the hydrophobe resinous condensation product has taken place, which thereafter is converted with water as above described. But owing to the higher contents of formaldehyde which causes an inclination of the formed product to be re-transformed into a resin drying has to be effected more slowly and at lower temperatures.

6. 100 parts of thiourea (1 molecule) are dissolved in 220 parts of the formaldehyde solution (2 molecules of formaldehyde). The mixture is heated for about ½ to ¾ of an hour in a boiler provided with a reflux condenser to initiate the condensation. Thereafter to the boiling reaction mixture a solution of 39.5 parts of urea in 110 parts of the formaldehyde solution is added. The mixture is then kept at the boiling temperature for another 1 to 1½ hours. The flour-like fine powder resulting from this reaction mixture which during boiling has remained water clear, yields, when hot-pressed, articles having the clarity of glass.

7. 100 parts of thiourea are heated with 220 parts of the formaldehyde solution under reflux condensation. After a short boiling for ½ to ¾ of an hour to the formed initial condensation product 79 parts of urea which had been dissolved in 220 parts of the formaldehyde solution are added and heating the reaction mixture is then continued for 2 to 2½ hours. The conversion of the condensation product into a powdery state takes place as above described. The articles obtained from the resulting powder by hot-pressing are water clear.

The powders produced as hereinbefore described, which, when hot-pressed, will readily flow to take the shape of a mold, are capable of being incorporated with large quantities of fillers. If desired, softening agents or such increasing the plasticity and also fluxes may be added, although such additions are not indispensable in view of the high flowing quality of the powder itself. For increasing the mechanical strength of the molded articles fillers of any kind may be used, such as fibrous substances of mineral origin (for instance asbestos) and/or of vegetable origin (for instance cellulose in any form as cotton flocks, wood pulp, saw dust, wood flour, cork, flax and the like) and/or of animal origin (for instance wool, silk, leather scrap etc.).

Preferably the fillers are distributed in the water to be employed for contacting therewith the hydrophobe condensation product for the purpose of effecting its transformation into the powdery state, but they may also be added to the resinous condensation product before contacting it with water or may also be incorporated with the wet or dry powder.

The articles molded from such powder with or without fillers are of high qualities and therefore may be used for a wide range of industrial purposes, especially as substitutes for glass, milk-glass, porcelain etc., further more in view of their high electrical insulating power for such insulating purposes and also as fancy articles. Molded pieces made by pressing such powder mixed with appropriate fillers are very fit for being mechanically worked.

I wish to be understood, that in my claims the term "formaldehyde" is employed to include the use of the polymers of formaldehyde.

I claim:

1. The process of making a molding powder which consists in reacting on thiourea with formaldehyde in the presence of water whilst applying heat, allowing the reaction to progress until a hydrophobe resinous condensation product has been formed which separates from a sample of the reaction mixture when the latter is cooling, interrupting the heating after this condition has been reached and contacting the reaction mass with water until conversion of the condensation product into a fine powder has taken place, separating such powder from the bulk of the remaining liquid, and drying it.

2. The process of making a molding powder which consists in reacting on thiourea with formaldehyde in the presence of water whilst applying heat, allowing the reaction to progress until a hydrophobe resinous condensation product has been formed which separates from a sample of the reaction mixture on cooling, interrupting the heating after this condition has been reached, thereafter bringing water into contact with the reaction mass, permitting the condensation product to undergo conversion into a fine powder whilst promoting such conversion by mechanical treatment, separating such powder from the bulk of the remaining liquid, and washing and drying it.

3. The method of making a molding powder which consists in dissolving thiourea in a watery solution of formaldehyde, heating the so prepared solution until a hydrophobe resinous condensation product has been formed, pouring the whole of the hot reaction mass into water, allowing a fine powder to form in the mixture from the said condensation product, separating such powder from the bulk of the remaining liquid, and drying it.

4. The method of making a molding powder which consists in dissolving thiourea in a watery solution of formaldehyde, boiling the so prepared solution until a hydrophobe resinous condensation product has been formed, precipitating the said condensation product by contacting the reaction mass with water at a temperature below about 20° C., allowing a fine powder to form in the mixture from the said condensation product, separating such powder from the bulk of the remaining liquid, and washing and drying it.

5. The process of making a molding powder which consists in reacting on thiourea with formaldehyde, the formaldehyde being present in a smaller proportion than would correspond to 3 molecules of formaldehyde to 1 molecule of the thiourea, heating the mixture until there is effected the formation of a hydrophobe resinous condensation product which on cooling a sample of the reaction mass is separating from the latter, bringing the hot reaction mass into contact with cold water until conversion of the first formed resinous condensation product into a fine powder has taken place, separating such powder from the bulk of the liquid, and washing and drying it.

6. The process of making a molding powder which consists in reacting on thiourea with formaldehyde, the formaldehyde being present in a ratio which corresponds to 1.4 molecules of formaldehyde to 1 molecule of the thiourea, heating the mixture until there is effected the formation of a hydrophobe resinous condensation product which separates from a sample of the reaction mass when the latter is cooling, bringing the hot reaction mass into contact with cold water until conversion of the first formed resinous condensation product into a fine powder has taken place, separating such powder from the bulk of the liquid, and washing and drying it.

7. A process of making a molding powder, which comprises producing a mixed condensation product by reacting with formaldehyde under heat upon thiourea and urea in combination, the proportion of the thiourea in the product being not less than corresponds to 1 molecule of thiourea to 1 molecule of urea, whilst allowing the reaction to proceed until a hydrophobe resinous reaction product has been formed, which separates from a sample of the reaction mixture on cooling, interrupting the heating after this condition has been reached and bringing water into contact with the reaction mass, permitting the condensation product to undergo conversion into a fine powder, separating such powder from the bulk of the remaining liquid and washing and drying it.

8. A process of making a molding powder, which comprises producing a mixed condensation product of thiourea and urea with formaldehyde, the proportion of the thiourea in the product being not less than corresponds to 1 molecule of thiourea to 1 molecule of urea, whilst allowing the reaction to proceed until formation of a hydrophobe resin has taken place separating from a sample of the reaction mixture when the latter is cooling and having the property of being converted into a powder when brought into intimate contact with water, pouring the hot reaction mass into water, allowing a powder to form in the mixture from the first formed condensation product, separating the said powder from the bulk of the liquid, and washing and drying it.

9. A process of the character defined in claim 8, in which the formaldehyde is employed in a quantity not greater than that corresponding with 2 molecules of formaldehyde to 1 molecule of each of the two other starting substances, that is thiourea and urea.

10. The process of making a molding powder which comprises reacting upon thiourea with formaldehyde in the presence of water to initiate condensation, adding to the reaction mixture a solution of urea in formaldehyde in an amount which corresponds to the quantity of the thiourea in a ratio not exceeding the proportion of 1 molecule urea to 1 molecule thiourea, causing the reaction to progress by boiling the reaction mixture under reflux condensation until a hydrophobe mixed condensation product has been formed which separates from a sample of the reaction mass on cooling, interrupting the heating after this condition has been attained, thereafter contacting the hot reaction mass with water, and permitting the precipitating resinous condensation product to undergo conversion into a fine powder, separating such powder from the bulk of the liquid, and washing and drying it.

11. A molding powder obtained by reacting on thiourea with formaldehyde to produce a hydrophobe resinous condensation product having the property of separating from a sample of the reaction mass on cooling and of undergoing conversion into a powder in intimate contact with water followed by a treatment of the formed reaction mass with water to convert the condensation product into a fine powder free from electrolytes.

12. A molding powder obtained by condensing thiourea with a smaller amount of formaldehyde than would correspond to 3 molecules of the formaldehyde to 1 molecule of the thiourea, to produce a resinous condensation product capable of separating from a sample of the reaction mass on cooling and of undergoing conversion into a powder in intimate contact with water and contacting the formed hot reaction mass with water to convert the condensation product into a fine powder free from electrolytes.

13. A molding composition containing a product of the condensation between thiourea and formaldehyde, the formaldehyde being present from the beginning of the condensation reaction in a smaller amount than would correspond to 2 molecules of formaldehyde to 1 molecule of the thiourea, and being free from electrolytes.

14. A molding powder obtained by reacting with formaldehyde on thiourea and urea in combination to produce a hydrophobe resinous condensation product having the property of separating from a sample of the reaction mass on cooling and of undergoing conversion into a powder in intimate contact with water, treating the so formed reaction mass with water, and separating and drying the resultant powder.

15. A molding powder obtained by contacting with water a hydrophobe resinous condensation product resulting from the reacting of formaldehyde on thiourea and urea in combination, the proportion of the thiourea in the product being not less than corresponds to 1 molecule of thiourea to 1 molecule of urea.

In testimony whereof I affix my signature.
KURT RIPPER.